UNITED STATES PATENT OFFICE 1,971,847

METHOD OF IMPREGNATING A SOLID TO CONTROL ITS CHEMICAL ACTIVITY

Georges Baume and André Glorifet, Boulogne-sur-Seine, Paris, France

No Drawing. Application January 7, 1932, Serial No. 585,392. In France January 20, 1931

8 Claims. (Cl. 23—243)

Certain chemical reactions produced by the action of a liquid reagent on a solid are frequently violent and, in such cases, give rise to a discharge of gas which it is difficult to regulate. Such is the case for instance in reactions into which enter water or electrolytic solutions on the one hand and mineral composite bodies, on the other hand, such as sulphides, silicides, carbonates, nitro compounds, phosphides, hydrides, carbides, etc. Moreover when water is among the liquids which produce a violent reaction with the solid substance in question, the preservation of the said substance is difficult for the water vapor contained in the atmosphere is sufficient to set up the reaction and to render the substance useless little by little.

The violent and irregular action of water on calcium carbide and the consequent difficulty in preserving such carbide may be mentioned in particular.

The object of the present invention is a new process which makes it possible, by physicochemical means, to transform the aforementioned solid bodies into a mass which, under the action of the liquid reagent, will then provide a moderate, uniform discharge.

One of the objects of the invention is also the application of this process for the preservation of solid substances which are liable to deteriorate in the presence of damp air.

Finally the industrial products obtained by the application of this process also form part of the object of the invention.

The invention consists in impregnating deeply the solid bodies of which it is desired to regulate the chemical reactions by means of a substance of which the composition will be given hereinunder.

Impregnation may be effected by immersion, by sprinkling and by any other process, particularly by means of the process applied in the impregnation of wood, said process consisting in setting up a vacuum in the vessels containing the solid substance and then impregnating said substance under pressure.

According to the viscosity of the impregnating liquid and to its power of penetration into the solid mass considered, impregnation is either carried out cold or after previously heating the impregnating liquid as well, in case of need, as the solid body it is desired to impregnate. In cases where the manufacture of the said solid body is carried out under the effect of heat it will be possible to operate, for instance, before it has completely cooled down.

The most important part of the impregnating liquid is essentially constituted by a suitably selected substance which is a liquid or has previously been brought to the liquid state and which does not react on the solid body it is proposed to impregnate.

Preferably after having been dehydrated and rendered chemically neutral in respect of the substances to be impregnated, it is possible to use the various substances which are liquids or are capable of assuming a liquid form, extracted from natural petroleums, oil shale, wood-tar, coal-tar, brown-coal tar, the products of cracking and of hydrogenizing. These products are used alone or in a state of mixture with one another.

To these bodies is added a suitable quantity, which is generally small, of a body or of a mixture of bodies possessing a very low surface tension and capable of forming spontaneously layers of very small thickness (a thickness containing but a small number of molecules). These bodies must be capable of communicating this property to the impregnating liquid in order that deep impregnation of the solid substance may be rendered possible.

As an indication, and in no sense as a limitation, the applicants mention, as being substances belonging to this category of bodies: the upper ethers of the fatty series and, in particular, animal and vegetable fats, soaps and soapy solutions, saponine, amine-acids and their ethers, casein and similar bodies.

A liquid is thus obtained which has no chemical action on the body it is proposed to impregnate and which is capable of procuring uniform and deep impregnation of the constitutive elements of the solid mass. For the sake of convenience we will, in the description which follows, call this liquid, liquid A.

Conformably to the invention a suitable quantity, which is usually small, of a liquid B the composition of which is about to be indicated, is added to liquid A. This composition may vary according to the result it is proposed to obtain, but it will be comprised in one of the following groups:

Liquid B is constituted by a liquid or a mixture of liquids which is very readily soluble both in the liquid reagent and in impregnating liquid A. It may be constituted by liquid substances of mineral or organic origin or else by mineral or organic salts (chlorides, for instance calcium or magnesium chloride, bromides, sulphates, acetates, phenates, alkaline soaps, etc.) dissolved in a liquid which only attacks the solid matter it is desired to protect very slightly or not at all. As an indication, and in no wise as a limitation, mono and poly alcohols, ketones, etc. may be mentioned.

The object of this addition is to facilitate and regulate the action of the chemically active liquid on the solid substance.

Of course the aforementioned bodies will preferably be employed in the anhydrous state or in a state closely approximating this when the reagent liquid is water.

A method of putting into effect which has procured satisfactory results consists in using, as a total impregnating mixture, one of the following mixtures:

1. 
| | Parts | |
|---|---|---|
| Fuel-oil | 75 | Impregnation under heat |
| Medium coal oils | 10 | |
| Heavy acetone | 10 | |
| Oleine | 5 | |

2. 
| | Parts | |
|---|---|---|
| Gas-oil | 85 | Cold impregnation |
| Anhydrous denatured alcohol | 6 | |
| Cetylic alcohol | 2 | |
| Glycerine stearate | 7 | |

3. 
| | Parts | |
|---|---|---|
| Medium tar oils deprived of phenols and of naphthols | 90 | Cold impregnation |
| Saturated solution of soap in alcohol | 7 | |
| Ricinoleate of butyl | 3 | |

If a solid body, impregnated conformably to the invention, is plunged into a liquid capable of reacting chemically on it, this liquid will be dissolved, in part, in that portion of the impregnating liquid with which it is miscible, and this dissolved portion will react chemically on the solid body; the action will be tempered owing to the fact that the greater portion of the impregnating liquid is chemically inactive and not miscible with the reacting liquid.

That portion which is miscible both in the impregnating liquid and in the reacting liquid thus plays the part of a third solvent and of a vehicle for the active liquid. Those parts of the impregnating liquid which are chemically neutral in relation to the reacting system ensure, in addition, an automatic re-impregnation of those portions of the solid which had not previously been attacked or which might have been insufficiently protected during the first impregnation. This automatic re-impregnation contributes to protect the solid against the vapors of the reacting liquid when the action of the latter is arrested before the whole of the solid body has been entirely attacked. A further consequence of this fact is that it protects solid bodies while they are in stock, when the water vapor contained in the atmosphere is liable to exert a chemical action on them. Moreover the impregnated solid substance is thus protected during the interval between two successive utilizations.

As an example calcium carbide impregnated according to the process of the invention keeps remarkably well. Moreover it offers increased mechanical resistance, particularly owing to the nonexistence of dust resulting from partial reactions. Finally the regularity of the reaction prevents the swellings which are usually to be observed and reduces to the extreme limit the heat resulting from the reaction.

This carbide may be used directly in all acetylene generators in which it suppresses the dangers of spontaneous explosion. But it is advantageous to use very simple generators, such as the Kipp apparatus, and those derived from it, the use of which is absolutely impossible with the calcium carbide at present supplied by the trade.

The gas given off is characterized, on the one hand, by the smell which is far less intense and far less disagreeable than that of ordinary acetylene gas; on the other hand it can be produced without danger and used with advantage at a pressure greater than atmospheric pressure thus permitting of applications which had not previously been made (the working of very thin sheet metal in autogenous welding, utilization in boats, etc.).

Finally attention should be called to the fact that, owing to the texture of the carbide impregnated conformably to the invention, the discharge of gas ceases the moment said carbide is no longer in contact with the water.

Conformably to the present invention liquid B may be composed of substances which are both miscible with the reacting liquid and with the impregnating liquid, but capable of acting chemically on the solid body it is desired to protect in order to form a compound soluble in the reacting liquid, on condition however that it has a sufficiently weak action on the body to be protected to avoid all appreciable loss of useful substance.

The latter result is obtained in the following manner:

To liquid B, the composition of which is that hereinabove indicated, is added a small quantity of a substance acting chemically on the body to be protected and capable of giving a single liquid phase with impregnating liquid A on the one hand and with the reacting liquid on the other hand.

The particular case of calcium carbide can be mentioned as an instance.

A solution of hydrochloric acid in alcohol or in acetone, or more generally a solution of halogene acids in an organic liquid will be substituted for the alcohol or for the acetone which serve as vehicles for the reacting liquid. For instance instead of alcohol or acetone as said hereinabove, a solution containing 10% of hydrochloric acid and 90% of alcohol or of acetone, may be taken. The hydrochloric acid thus acts slowly and regularly and forms chloride with the calcium carbide, said chloride by its existence, considerably assisting the penetration of the water in the impregnating protecting layer owing to its great solubility in this liquid.

A considerable effect is thus obtained although the chemical attack is sufficiently weak not to determine any appreciable loss of useful substances.

The applicants have established that when it is only preservation of the product which is desired it is generally possible to suppress liquid B which is miscible both with the reacting liquid and with the impregnating liquid.

Thus in the industry of transformation of calcium carbide into cyanamide, it is frequently necessary to put the material into stock and to protect it against oxidation, particularly in contact with damp air between the time when the carbide is run into bricks and the crushing which immediately precedes the introduction of the material into the cyanamide oven. In this case one can use, as a protecting liquid, a mixture containing only a small quantity of the body or of the system of bodies capable of giving the mixture its covering and penetrating qualities owing to the spontaneous formation of these layers, in addition to the inert and adhesive liquid. This mixture is applied by any suitable means and, in practise, can be utilized just as well in the case of carbide in bricks as of carbide dust.

It is evident that the substances impregnated conformably to the invention may be applied in a number of ways. Among the new applications of calcium carbide impregnated according to the process of the invention, the following applications should be noted:

Its application for the destruction of animals, larvæ and eggs injurious to agriculture, meadows, sports grounds, etc. such as white worm, Colorado-beetle, green-fly, mole-cricket, grasshopper and cockchafer's eggs, moles, field-mice, etc. It has been known for a long time that the gases given off by calcium carbide under the effect of damp make the destruction of these various organisms possible, but the carbide which has been used up to the present is submitted to an attack which is too rapid and too violent by the water contained in the soil and which is of too short a duration to cause the destruction of the aforementioned organisms. On the contrary calcium carbide impregnated conformably to the invention can be sprinkled on the surface of the ground or buried beforehand at points regularly distributed in the soil it is desired to protect without any fear of this violent chemical reaction. On the contrary the discharge of gas proceeds in a progressive and prolonged manner. Systematic destruction of all detrimental animals and germs is thus obtained without any drawbacks.

Another application of the process of protection which forms the subject matter of the invention is also the keeping in stock of the carbide in damp locations, for instance in the neighborhood of ports, of navigable waterways, in actual navigation, in coasting fishery, etc.

Finally, as has already been mentioned hereinabove, the invention aims at the preparation and use of all products impregnated according to the process which forms the subject matter of the invention, particularly the production and use of metallic carbides other than calcium carbide which, on account of their chemical constituents, procure a more considerable quantity of acetylene gas per unit of mass.

Among these new carbides which are capable of being employed in industry are, more particularly, magnesium carbide and calcium and magnesium double carbide.

Evidently the methods and arrangements hereinabove are mentioned purely as indications and are in no way to be taken as limitative and variations in said methods and arrangements may be made without in any way departing from the subject matter of the invention.

What we claim is:

1. A method of impregnating a solid for controlling chemical reactions comprising impregnating said solid with a liquid comprising a liquid agent inert chemically to said solid, a second liquid agent having a low surface tension for aiding said first agent in impregnating said solid and a third liquid agent miscible in said impregnating liquid.

2. A process for impregnating a solid so as to control the chemical reaction of said solid with a liquid reagent comprising impregnating said solid with a liquid comprising a liquid agent inert chemically to said solid, a second liquid agent having a low surface tension for aiding said first agent in impregnating said solid and a third liquid agent miscible both in said liquid reagent and in the impregnating liquid.

3. A method of impregnating a solid for controlling the chemical reaction thereof comprising impregnating said solid with a liquid comprising a liquid agent taken from a group consisting of substances extracted from natural petroleum, bituminous shale, wood-tar, coal-tar, brown coal-tar and products obtained from cracking and hydrogenation processes, a second liquid agent having a very low surface tension for aiding said first liquid agent in impregnating said solid and a third liquid agent miscible in the impregnating liquid.

4. A method of impregnating a solid for controlling the chemical reaction thereof comprising impregnating said solid with a liquid comprising a first liquid agent chemically inert to said solid, a second liquid agent having a low surface tension taken from a group consisting of higher ethers of the fatty series, mineral and vegetable oils and fats, soaps, amino-acids and their ethers and casein and a third liquid agent miscible in said first two agents mentioned.

5. A method of impregnating a solid so as to control the chemical reaction thereof with a liquid reagent comprising impregnating said solid with a first liquid agent inert chemically to said solid, a second liquid agent having a low surface tension and thereby capable of aiding the impregnation of said solid with said first liquid agent and a third liquid agent miscible both with said liquid reagent and the first two liquid agents mentioned taken from a group consisting of mono-alcohols, poly-alcohols, ketones and the organic solutions of salts.

6. A method of impregnating a solid so as to control the chemical reaction thereof with a liquid reagent comprising impregnating said solid with a first liquid agent inert chemically to said solid, a second liquid agent having a low surface tension and thereby capable of aiding the impregnation of said solid with said first liquid agent and a third liquid agent miscible both with said liquid reagent and the first two liquid agents mentioned taken from a group consisting of mono-alcohols, poly-alcohols, ketones and the organic solutions of salts and a small quantity of a substance having a chemical reaction upon said solid added to said third liquid agent and capable of procuring with said reacting liquid and said impregnating liquid a single liquid phase.

7. A method of impregnating calcium carbide for controlling chemical reactions comprising impregnating said calcium carbide with a liquid comprising a liquid agent inert chemically to said calcium carbide, a second liquid agent having a low surface tension for aiding said first agent in impregnating said calcium carbide and a third liquid agent miscible in said impregnating liquid.

8. A process for impregnating calcium carbide so as to control the chemical reaction of said calcium carbide with a liquid reagent comprising impregnating said calcium carbide with a liquid comprising a liquid agent inert chemically to said calcium carbide, a second liquid agent having a low surface tension for aiding said first agent in impregnating said calcium carbide and a third liquid agent miscible both in said liquid reagent and in the impregnating liquid.

GEORGES BAUME.
ANDRÉ GLORIFET.